(12) United States Patent
Schuck

(10) Patent No.: US 8,311,742 B2
(45) Date of Patent: Nov. 13, 2012

(54) ESTIMATING PHOTOSPHERIC VELOCITIES FOR SPACE-WEATHER PREDICTION

(75) Inventor: Peter W. Schuck, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 390 days.

(21) Appl. No.: 12/692,393

(22) Filed: Jan. 22, 2010

(65) Prior Publication Data
US 2010/0191468 A1      Jul. 29, 2010

Related U.S. Application Data

(60) Provisional application No. 61/146,808, filed on Jan. 23, 2009.

(51) Int. Cl.
  *G01V 3/00*      (2006.01)
(52) U.S. Cl. .......................................................... 702/2
(58) Field of Classification Search ........................ 702/2
    See application file for complete search history.

(56) References Cited

U.S. PATENT DOCUMENTS

| 5,125,743 A | 6/1992 | Rust et al. | |
| 2006/0229813 A1* | 10/2006 | Tobiska | 702/2 |

FOREIGN PATENT DOCUMENTS

| WO | 20070064953 | 6/2007 |

OTHER PUBLICATIONS

J.T. Gosling, "The Solar Flare Myth," J. Geophys. Res., 98(A11), 18,937-18,949 (1993).
C. Foullon, N. Crosby, and D. Heynderickx, "Toward Interplanetary Space Weather: Strategies for Manned Missions to Mars," Space Weather, 3, S07004 (2005) [http://www.agu.org/journals/sw/swa/feature/article/?id=2004SW000134, accessed Jan. 15, 2010].
T. Kusano, T. Maeshiro, T. Yokoyama, and T. Sakurai, "Measurement of Magnetic Helicity Injection and Free Energy Loading into the Solar Corona," Ap.J., 577:501-512 (2002).
M.K. Georgoulis and B.J. Labonte, "Magnetic Energy and Helicity Budgets in the Active Region Solar Corona. I. Linear Force-Free Approximation." Ap.J. 671:1034-1050 (2007).
B.T. Welsch, W.P. Abbett, M.L. Derosa, G.H. Fisher, M.K. Georgoulis, K. Kusano, D.W. Longope, B. Ravindra, and P.W. Schuck., "Tests and Comparisons of Velocity-Inversion Techniques," Ap.J., 670:1434 1452 (2007).
M.A. Berger and A. Ruzmaikin, "Rate of helicity production by solar rotation," J. Geophys. Res., 105, 10481-10490 (2000).
P. Démoulin & M.A. Berger, "Magnetic Energy and Helicity Fluxes at the Photospheric Level," Sol. Phys. 215, 203-215 (2003).

(Continued)

*Primary Examiner* — Stephen Cherry
(74) *Attorney, Agent, or Firm* — Amy Ressing; Joslyn Barritt

(57) ABSTRACT

A computer-implemented method for accurately estimating plasma velocities on the photosphere based on magnetic field data from vector magnetograms. Spatial and temporal derivatives of the magnetic field components are computed and a structure tensor containing terms that specifically include the horizontal magnetic field components is constructed. The structure tensor is convolved with a window function and a least-squares solution based on the convolved structure tensor is found. The solution includes the plasma velocities in the horizontal and vertical directions at the center of the window.

7 Claims, 9 Drawing Sheets

OTHER PUBLICATIONS

D. Marr and S. Ullman, "Directional Selectivity and its Use in Early Visual Processing," Proceedings of the Royal Society of London. Series B, Biological Sciences, vol. 211, No. 1183, pp. 151-180 (1981).

P.W. Schuck, "Tracking Magnetic Footpoints with the Magnetic Induction Equation," Ap.J., 646:1358-1391 (2006).

W.P. Abbett, G.H. Fisher, and Y. Fan, "The Three-Dimensional Evolution of Rising, Twisted Magnetic Flux Tubes in a Gravitationally Stratified Model Convection Zone," Ap.J., 540:548-562 (2000).

W.P. Abbett, G.H. Fisher, Y. Fan, and D.J. Berick, "The Dynamic Evolution of Twisted Magnetic Flux Tubes in a Three-Dimensional Convecting Flow. II. Turbulent Pumping and the Cohesion of $\Omega$-Loops," Ap.J., 612:557-575 (2004).

L. November and G. Simon, "Precise Proper-Motion Measurement of Solar Granulation," Ap.J., 333:427-442 (1988).

P.W. Schuck, "Tracking Vector Magnetograms With the Magnetic Induction Equation," Ap.J. 683:1134-1152 (2008).

B.T. Welsch, Y. Li, P.W. Schuck, and G. Fisher, "What is the Relationship Between Photospheric Flow Fields and Solar Flares?", Ap.J. 705:821-843 (2009).

G. Golub et al., "An Analysis of the Total Least Squares Problem," SIAM Journal on Numerical Analysis, vol. 17, No. 6 (Dec. 1980), pp. 883-893.

M. Küker, T. Henning, and G. Rüdiger, Magnetic Star-Disk Coupling in Classical T Tauri Systems, Ap. J., 589:397-409, May 20, 2003.

Search Report and Written Opinion Dated Mar. 19, 2010 in PCT Application PCT/US2010/021831.

\* cited by examiner $$S(\chi; x, t) \equiv \begin{bmatrix} A & b \\ b & G_{99} \end{bmatrix}$$

$$= \begin{bmatrix}
G_{00} & & & & & & & & & & G_{90} \\
G_{10} & G_{11} & & & & & & & & & G_{91} \\
G_{20} & G_{21} & G_{22} & & & & & & & & G_{92} \\
G_{30} & G_{31} & G_{32} & G_{33} & & & & & & & G_{93} \\
G_{40} & G_{41} & G_{42} & G_{43} & G_{44} & & & & & & G_{94} \\
G_{50} & G_{51} & G_{52} & G_{53} & G_{54} & G_{55} & & & & & G_{95} \\
S_{60} & S_{61} & S_{62} & S_{63} & S_{64} & S_{65} & S_{66} & & & & G_{96} \\
S_{70} & S_{71} & S_{72} & S_{73} & S_{74} & S_{75} & S_{76} & S_{77} & & & G_{97} \\
S_{80} & S_{81} & S_{82} & S_{83} & S_{84} & S_{85} & S_{86} & S_{87} & S_{88} & & G_{98} \\
 & & & & & & & & & & G_{99}
\end{bmatrix}$$

FIG. 5

$G00 = (\partial xBz)^2$ $G10 = (\partial xBz)(\partial yBz)$ $G11 = (\partial yBz)^2$ $G20 = Bz(\partial xBz) + (\partial xBz)^2 x'$ $G21 = Bz(\partial yBz) + (\partial xBz)(\partial yBz)x'$ $G22 = Bz^2 + 2Bz(\partial xBz)x' + (\partial xBz)2x'^2$ $G30 = Bz(\partial xBz) + (\partial xBz)(\partial yBz)y'$ $G31 = Bz(\partial yBz) + (\partial yBz)^2 y'$ $G32 = Bz^2 + Bz(\partial xBz)x' + Bz(\partial yBz)y' + (\partial xBz)(\partial yBz)x'y'$ $G33 = Bz^2 + 2Bz(\partial yBz)y' + (\partial yBz)^2 y'^2$ $G40 = (\partial xBz)^2 y'$ $G41 = (\partial xBz)(\partial yBz)y'$ $G42 = Bz(\partial xBz)y' + (\partial xBz)^2 x'y'$ $G43 = Bz(\partial xBz)y' + (\partial xBz)(\partial yBz)y'^2$ $G44 = (\partial xBz)^2 y'^2$ $G50 = (\partial xBz)(\partial yBz)x'$ $G51 = (\partial yBz)^2 x'$ $G52 = Bz(\partial yBz)x' + (\partial xBz)(\partial yBz)x'^2$ $G53 = Bz(\partial yBz)x' + (\partial yBz)^2 x'y'$ $G54 = (\partial xBz)(\partial yBz)x'y'$ $G55 = (\partial yBz)2x'^2$

FIG. 6A $s60 = -(\partial xBx)(\partial xBz) - (\partial yBy)(\partial xBz)$ $s61 = -(\partial xBx)(\partial yBz) - (\partial yBy)(\partial yBz)$ $s62 = -(\partial xBx)Bz - (\partial yBy)Bz - (\partial xBx)(\partial xBz)x' - (\partial yBy)(\partial xBz)x'$ $s63 = -(\partial xBx)Bz - (\partial yBy)Bz - (\partial xBx)(\partial yBz)y' - (\partial yBy)(\partial yBz)y'$ $s64 = -(\partial xBx)(\partial xBz)y' - (\partial yBy)(\partial xBz)y'$ $s65 = -(\partial xBx)(\partial yBz)x' - (\partial yBy)(\partial yBz)x'$ $s66 = (\partial xBx)^2 + 2(\partial xBx)(\partial yBy) + (\partial yBy)^2$ $s70 = -Bx(\partial xBz) - (\partial xBx)(\partial xBz)x' - (\partial yBy)(\partial xBz)x'$ $s71 = -Bx(\partial yBz) - (\partial xBx)(\partial yBz)x' - (\partial yBy)(\partial yBz)x'$ $s72 = -BxBz - (\partial xBx)Bz\,x' - (\partial yBy)Bz\,x' - Bx(\partial xBz)x'$
$\quad\quad - (\partial xBx)(\partial xBz)x'^2 - (\partial yBy)(\partial xBz)x'^2$ $s73 = -BxBz - (\partial xBx)Bz\,x' - (\partial yBy)Bz\,x' - Bx(\partial yBz)y'$
$\quad\quad - (\partial xBx)(\partial yBz)x'y' - (\partial yBy)(\partial yBz)x'y'$ $s74 = -Bx(\partial xBz)y' - (\partial xBx)(\partial xBz)x'y' - (\partial yBy)(\partial xBz)x'y'$ $s75 = -Bx(\partial yBz)x' - (\partial xBx)(\partial yBz)x'^2 - (\partial yBy)(\partial yBz)x'^2$ $s76 = Bx(\partial xBx) + Bx(\partial yBy) + (\partial xBx)^2 x' + 2(\partial xBx)(\partial yBy)x' + (\partial yBy)^2 x'$ $s77 = Bx^2 + 2Bx(\partial xBx)x' + 2Bx(\partial yBy)x' + (\partial xBx)^2 x'^2$
$\quad\quad + 2(\partial xBx)(\partial yBy)x'^2 + (\partial yBy)^2 x'^2$

FIG. 6B $s80 = -$ By $(\partial xBz) - (\partial xBx)(\partial xBz)$ y$' - (\partial yBy)(\partial xBz)$ y$'$ $s81 = -$ By $(\partial yBz) - (\partial xBx)(\partial yBz)$ y$' - (\partial yBy)(\partial yBz)$ y$'$ $s82 = -$ ByBz $-$ By $(\partial xBz)$ x$' - (\partial xBx)$ Bz y$' - (\partial yBy)$ Bz y$'$
$\quad - (\partial xBx)(\partial xBz)$ x$'$y$' - (\partial yBy)(\partial xBz)$ x$'$y$'$ $s83 = -$ ByBz $- (\partial xBx)$ Bz y$' - (\partial yBy)$ Bz y$' -$ By $(\partial yBz)$ y$'$
$\quad - (\partial xBx)(\partial yBz)$ y$'^2 - (\partial yBy)(\partial yBz)$ y$'^2$ $s84 = -$ By $(\partial xBz)$ y$' - (\partial xBx)(\partial xBz)$ y$'^2 - (\partial yBy)(\partial xBz)$ y$'^2$ $s85 = -$ By $(\partial yBz)$ x$' - (\partial xBx)(\partial yBz)$ x$'$y$' - (\partial yBy)(\partial yBz)$ x$'$y$'$ $s86 = (\partial xBx)$ By $+$ By $(\partial yBy) + (\partial xBx)^2$y$' + 2(\partial xBx)(\partial yBy)$ y$' + (\partial yBy)^2$y$'$ $s87 =$ BxBy $+ (\partial xBx)$ By x$' +$ By $(\partial yBy)$ x$' +$ Bx $(\partial xBx)$ y$' +$ Bx $(\partial yBy)$ y$'$
$\quad + (\partial xBx)^2$x$'$y$' + 2(\partial xBx)(\partial yBy)$ x$'$y$' + (\partial yBy)^2$x$'$y$'$ $s88 =$ By$^2 + 2(\partial xBx)$ By y$' + 2$By $(\partial yBy)$ y$' + (\partial xBx)^2$y$'^2$
$\quad + 2(\partial xBx)(\partial yBy)$ y$'^2 + (\partial yBy)^2$y$'^2$ $G90 = (\partial tBz)(\partial xBz)$ $G91 = (\partial tBz)(\partial yBz)$ $G92 =$ Bz $(\partial tBz) + (\partial tBz)(\partial xBz)$ x$'$ $G93 =$ Bz $(\partial tBz) + (\partial tBz)(\partial yBz)$ y$'$ $G94 = (\partial tBz)(\partial xBz)$ y$'$ $G95 = (\partial tBz)(\partial yBz)$ x$'$ $s96 = - (\partial xBx)(\partial tBz) - (\partial yBy)(\partial tBz)$ $s97 = -$ Bx $(\partial tBz) - (\partial xBx)(\partial tBz)$ x$' - (\partial yBy)(\partial tBz)$ x$'$ $s98 = -$ By $(\partial tBz) - (\partial xBx)(\partial tBz)$ y$' - (\partial yBy)(\partial tBz)$ y$'$ $G99 = (\partial tBz)^2$

*FIG. 6C*

ESTIMATING PHOTOSPHERIC VELOCITIES FOR SPACE-WEATHER PREDICTION

CROSS-REFERENCE

This application claims the benefit of priority based on U.S. Provisional Patent Application No. 61/146,808 filed on Jan. 23, 2009, the entirety of which is hereby incorporated by reference into the present application.

TECHNICAL FIELD

The present invention relates to analysis and prediction of space weather, particularly prediction of coronal mass ejections.

BACKGROUND

Coronal mass ejections (CMEs) are the ejection of material from the solar corona. The ejected material is a plasma consisting primarily of electrons and protons, together with their associated magnetic field.

CMEs are now recognized as the primary solar driver of non-recurrent geomagnetic storms. See J. T. Gosling, "The Solar Flare Myth," *J. Geophys. Res.*, 98(A11), 18,937-18,949 (1993). Non-recurrent geomagnetic storms driven by CMEs are the most damaging of space-weather phenomena to both space- and terrestrial-based technological systems and civilian infrastructure. The direct economic consequences of space-weather phenomena have been estimated at about $200-$400 million a year. Strong storms can disrupt numerous commercial systems such as electric power grids, oil pipelines, polar aviation routes, global positioning systems, satellite- and long-line communication systems, navigation systems, satellite operations, as well as space tracking and on-orbit operations of Space Shuttle and International Space Station (ISS) activities. Solar energetic particles (SEPs) caused by CME shock fronts also represent a clear radiation hazard to manned space missions, especially for missions beyond the protection of the Earth's magnetosphere. Indeed, some have suggested that the dangers and unpredictability of solar eruptions may operationally constrain a manned mission to Mars. See C. Foullon, N. Crosby, and D. Heynderickx, "Toward Interplanetary Space Weather: Strategies for Manned Missions to Mars," *Space Weather*, 3, S07004 (2005) [http://www.agu.org/journals/sw/swa/feature/article/?id=2004SW000134, accessed Jan. 15, 2010].

Understanding the processes which drive CME eruptions is therefore an important goal. Of even more concern is identifying and understanding the precursors of a CME eruption. Identifying the precursors that lead to solar eruptions is critical to developing predictive tools for space weather. If the precursors of a CME can be identified, it may be possible to forecast a CME eruption before it occurs so that appropriate steps may be taken to mitigate its effects.

CMEs are driven by magnetic forces. One main difference between driving mechanisms depends on whether the magnetic helicity and energy are first stored in the corona and later released by reconnection and instability or whether the helicity and Poynting fluxes are roughly concomitant with the eruption. The net free energy stored in the corona may be estimated by comparing the energy transported into the corona versus the "ground state" energy of a coronal potential magnetic field ($B=-\nabla\Phi$) consistent with the normal component of vector magnetic field observed in the photosphere. See T. Kusano, T. Maeshiro, T. Yokoyama, and T. Sakurai, "Measurement of Magnetic Helicity Injection and Free Energy Loading into the Solar Corona," *Ap. J.*, 577:501-512 (2002); and M. K. Georgoulis and B. J. LaBonte, "Magnetic Energy and Helicity Budgets in the Active Region Solar Corona. I. Linear Force-Free Approximation." *Ap. J.* 671: 1034-1050 (2007). See also FIG. 1, which illustrates an increase in the free energy before the Halo CME which was observed just prior to 0600 UT on Nov. 4, 1997, as shown by the vertical dashed line shown in the figure. The timing and magnitude of the transport of magnetic helicity and energy through the photosphere provides an important discriminator between the mechanisms. Kusano's method was later shown to be inaccurate for estimating energy flux in the photosphere. See B. T. Welsch, W. P. Abbett, M. L. DeRosa, G. H. Fisher, M. K. Georgoulis, K. Kusano, D. W. Longope, B. Ravindra, and P. W. Schuck., "Tests and Comparisons of Velocity-Inversion Techniques," *Ap. J.*, 670:1434-1452 (2007) (hereinafter "Welsch 2007"), incorporated by reference herein in its entirety.

The magnetic helicity and Poynting flux may be estimated from photospheric velocities inferred from a sequence of vector magnetograms. See M. A. Berger and A. Ruzmaikin, "Rate of helicity production by solar rotation," *J. Geophys. Res.*, 105, 10481-10490 (2000); and P. Démoulin & M. A. Berger, "Magnetic Energy And Helicity Fluxes At The Photospheric Level," *Sol. Phys.* 215, 203-215 (2003) (hereinafter "Démoulin & Berger"), the entirety of which are incorporated by reference herein. However, accurately estimating photospheric velocities from a sequence of images is extremely challenging because image motion is ambiguous. An "aperture problem" occurs when different velocities produce image dynamics that are indistinguishable. See, e.g., D. Marr and S. Ullman, "Directional Selectivity and its Use in Early Visual Processing," *Proceedings of the Royal Society of London. Series B, Biological Sciences*, Vol. 211, No. 1183, pp. 151-180 (1981), incorporated by reference herein.

Optical flow methods solved these underdetermined or ill-posed problems having no unique velocity field solution by applying additional assumptions about flow structure or flow properties to enforce uniqueness. For example, P. W. Schuck, "Tracking Magnetic Footpoints with the Magnetic Induction Equation," *Ap. J.*, 646:1358-1391 (2006) (hereinafter "Schuck 2006"), the entirety of which is hereby incorporated by reference into the present disclosure, and Welsch 2007, supra, provide an overview of optical flow methods for recovering estimates of photospheric velocities from a sequence of magnetograms.

Previous methods have attempted to estimate the photospheric velocity using the normal component of the induction equation $$\partial_t B_z + \nabla_h \cdot (B_z V_h - V_z B_h) = 0, \qquad (1)$$

where the plasma velocity V and the magnetic fields B are decomposed into components based on a local right-handed Cartesian coordinate system, with $B_z = B_z \hat{z}$ in a vertical direction along the z-axis and $B_h = B_x \hat{x} + B_y \hat{y}$ along the horizontal image plane containing the x- and y-axes.

Démoulin & Berger cited above showed that the magnetic energy and helicity fluxes can be computed from the flux transport vector $$F = UB_z = B_z V_h - V_z B_h = \hat{z} \times (V \times B) = \hat{z} \times (V_\perp \times B) \qquad (2)$$

where F is the flux transport vector, U is the horizontal magnetic footpoint velocity, also known as the flux transport velocity, and $V_\perp$ is the plasma velocity perpendicular to the magnetic field.

Specifically, Démoulin & Berger showed that the relative helicity can be computed from the flux transport vector $UB_z$:

$$\frac{d\Delta H}{dt} = -\int 2A_p \cdot (UB_z)dxdy \qquad (3)$$

where $A_p = \hat{z} \times \nabla \Phi_p$ is the potential reference field (with zero helicity) which satisfies the relation $\hat{z}\cdot(\nabla \times A_p) = \nabla_h^2 \Phi_p = B_z$ and the integral is taken over all points x, y in the image plane.

Similarly, the net power through the photosphere can be computed from the horizontal magnetic field $B_h$ and the flux transport vector $UB_z$:

$$\frac{d\Delta E}{dt} = -\int \frac{B_h \cdot (UB_z)}{4\pi} dxdy \qquad (4)$$

The net free energy $\Delta E_f$ available for production of a CME may be found from the net power through the photosphere $$\frac{d\Delta E}{dt}$$

and the time rate of change of energy in the associated potential magnetic field $$\frac{dE_p}{dt}$$

$$\Delta E_f = \int dt \left( \frac{d\Delta E}{dt} - \frac{dE_p}{dt} \right) \qquad (5)$$

where $$\frac{d\Delta E}{dt}$$

is as defined above and $$\frac{dE_p}{dt}$$

is the ground state potential energy due to the normal component $B_z$ of the magnetic field which may be time dependent. See, e.g., M. K. Georgoulis, supra. As noted above, the ground truth flux transport vector 1113, comprises two terms, $B_z V_h$ and $V_z B_h$. These terms represent shearing due to horizontal motion of the plasma and flux emergence due to vertical motion of the magnetic field, respectively. Thus, it is desirable to know the plasma velocity V, since it can be used to obtain the horizontal footpoint velocity U, which in turn can be used to compute the free energy and helicity available for the creation of a coronal mass ejection.

It will be noted at this point that as used herein, uppercase "U" denotes the "ground truth" flux transport velocity (also known as "horizontal footpoint velocity") and "V" denotes the ground truth plasma velocity, e.g., as modeled by anelastic magnetohydrodynamic (ANMHD) simulations or otherwise, see W. P. Abbett, G. H. Fisher, and Y. Fan, "The Three-Dimensional Evolution Of Rising, Twisted Magnetic Flux Tubes In A Gravitationally Stratified Model Convection Zone," *Ap. J.*, 540:548-562 (2000); W. P. Abbett, G. H. Fisher, Y. Fan, and D. J. Berick, "The Dynamic Evolution Of Twisted Magnetic Flux Tubes In A Three-Dimensional Convecting Flow. II. Turbulent Pumping And The Cohesion Of S2-Loops," *Ap. J.*, 612:557-575 (2004), incorporated by reference herein in their entirety, while lowercase "u" and "v" denote the corresponding estimated velocities in accordance with the present invention; see P. W. Schuck (2006), supra, and B. T. Welsch et al. (2007), supra, Démoulin & Berger argued, based on the geometry of a magnetic field line passing through the photosphere, that the term $UB_z$ could be substituted for $(B_z V_h - V_z B_h)$ in Equation (1), resulting in the following continuity equation for the vertical magnetic field $$\partial_t B_z + \nabla_h \cdot (UB_z) = 0 \qquad (6)$$

which could be solved directly for $UB_z$ without the need for knowledge of the plasma velocity components $V_h$ and $V_z$.

Démoulin & Berger further argued that existing tracking methods such as local correlation tracking described in L. November and G. Simon, "Precise Proper-Motion Measurement of Solar Granulation," *Ap. J.*, 333:427-442 (1988) provided an estimate u of the ground truth magnetic footpoint velocity U and that therefore Equation (3) can then be rewritten as $$\partial_t B_z + \nabla_h \cdot (uB_z) = 0 \qquad (7)$$

Based on Démoulin & Berger's arguments described above, attempts were made to estimate the horizontal magnetic footpoint velocity u by solving Equation (7) for u using a differential affine velocity estimator (DAVE) given a sequence of $B_z$ images. See Schuck 2006 and Welsch 2007, supra.

However, Equation (7) above contains only a $B_z$ term and does not include any information about the horizontal components $B_x$ and $B_y$ of the magnetic field. When the values of u obtained from Equation (7) were tested against ground truth values of U such as those obtained from ANMHD simulations, it was found that such estimated values of diverged significantly from the ground truth values. See Welsch 2007 and Schuck 2006, supra; see also P. W. Schuck, "Tracking Vector Magnetograms With The Magnetic Induction Equation," *Ap. J.* 683:1134-1152 (2008) (hereinafter "Schuck 2008"), incorporated herein by reference in its entirety. See also FIGS. 2A and 2B which show the x and y components of the ground truth velocity flux transport vector $UB_z$ versus the flux transport vector $uB_z$ based on the estimated footpoint velocity u computed using Equation (7). As can be seen in FIGS. 2A and 2B, the estimated flux transport vectors $u_x B_z$ and $u_y B_z$ diverge significantly from the ground truth values determined directly from the simulation data. Thus, the prior methods for estimating u and $uB_z$ did not provide the desirable level of accuracy needed for prediction of CMEs, and there remained a need for a method of accurately estimating the plasma velocities $v_h$ and $v_z$ so that more accurate values of u and $uB_z$ could be obtained.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a computer-implemented method, which may be denoted as a differential affine velocity estimator for vector magnetograms (DAVE4VM) method, for unambiguously and accurately estimating plasma velocities $v_h$ and $v_z$ on the photosphere based on magnetic field data from vector magnetograms. These plasma velocities can then be used to estimate the magnetic footpoint velocity u and the flux transport vector $uB_z$ and therefore the coronal free energy and helicity flux, which in turn can be used to forecast solar eruptions such as coronal mass ejections. Plasma velocity and flux transport vectors estimated in accordance with the present invention may also be used to estimate other magnetic field and flow properties that may be used to forecast space weather, such as convergence/divergence flows. See B. T. Welsch, Y. Li, P. W. Schuck, and G. Fisher, "What is the Relationship Between Photospheric Flow Fields and Solar Flares?", *Ap. J.* 705:821-843 (2009) (hereinafter "Welsch 2009"), incorporated herein by reference in its entirety.

In an exemplary embodiment in accordance with the present invention, data of a plurality of vector magnetograms $B_x B_y B_z$ representing the solar magnetic field is received by a computer, the pixels from each of the magnetograms being co-located or co-aligned so that only one p,q pixel exists for any p,q spatial point in the image. The computer then computes the horizontal spatial derivatives $\partial_x B_x, \partial_x B_y, \partial_x B_z, \partial_y B_z, \partial_y B_y, \partial_y B_z$ of both the horizontal and vertical components of the vector magnetograms and computes and the time derivative $\partial_t B_z$ of the vertical component. In other embodiments, these derivatives may already have been computed and the computer receives this data rather than the original magnetogram data.

Irrespective of the manner in which the data of the vector magnetogram spatial and time derivatives is received, in accordance with the present invention, the computer than constructs a structure tensor $S(\chi;x,t)$ from the spatial and time derivatives taken at each p,q pixel in the image plane comprising the combined $B_x$, $B_y$, and $B_z$ magnetograms.

The computer then convolves the structure tensor with a window function to localize the analysis to a specific area of the photosphere to obtain a matrix that is solved as a least-squares problem, for example, by singular value decomposition. The computer then solves the least-squares problem to find a vector of parameters $P=(\tilde{u}_0, \tilde{v}_0, \tilde{u}_x, \tilde{v}_y, \tilde{u}_y, \tilde{v}_x, \tilde{w}_0, \tilde{w}_x, \tilde{w}_y)$ which can be used to unambiguously estimate the plasma velocity v at that pixel, i.e., $\tilde{u}_0, \tilde{v}_0, \tilde{w}_0$ in the x, y, and z directions, respectively. This plasma velocity estimate can then be used to estimate the magnetic footpoint velocity u and the flux transport vector $uB_z$, which in turn can be used to estimate the coronal free energy and helicity available for the production of a coronal mass ejection or for estimation of other metrics such those described in Welsch 2009.

In addition, unlike previous methods, the present invention includes analysis of the horizontal components of the magnetic field in estimating the plasma velocities. Because the structure tensor used to obtain the vector of parameters explicitly includes the horizontal components of the magnetic field and the flows normal to the surface, a plasma velocity field modeled in accordance with the present invention is more accurate than those estimated by previous methods. In addition, because the plasma velocity field is estimated over a spatial window, a unique solution for the plasma velocity field can usually be found. Thus, the method of the present invention provides an estimation of the plasma velocity which can enable a more accurate estimation of the free energy available for the creation of a coronal mass ejection and thus can permit more accurate forecasting of CMEs.

BRIEF DESCRIPTION OF THE DRAWINGS

FIG. 5 depicts the structure tensor $S(\chi;x,t)$ used in a method for estimating photospheric plasma velocities in accordance with the present invention.

FIGS. 6A-6C provide the values of the matrix elements $G_{ij}$ and $s_{ij}$ making up the structure tensor $S(\chi; x, t)$ in accordance with the present invention.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a method, which may be at times referred to herein as a differential affine velocity estimator for vector magnetograms (DAVE4VM), for unambiguously estimating plasma velocities on the solar photosphere. The plasma velocities estimated in accordance with the present invention can be used to provide a more accurate estimate of the magnetic footpoint velocity and the velocity flux transport vector $uB_z$ of the magnetic fields, which in turn can be used to more accurately estimate the coronal free energy available for the production of a coronal mass ejection. Thus the present invention can be used to provide a more accurate predictor of the onset of a CME before it occurs so that appropriate proactive steps can be taken. Plasma velocity and flux transport vectors estimated in accordance with the present invention may also be used to estimate other magnetic field and flow properties that may be used to forecast space weather, such as convergence/divergence flows. See Welsch 2009.

As described in more detail below, the present invention includes a method for estimating solar photospheric plasma velocities, one or more aspects of which can be accomplished by one or more processors executing one or more sequences of one or more computer-readable instructions read into a memory of one or more computers wherein data of one or more vector magnetograms representing magnetic fields on the photosphere is received by the computer and is transformed into an unambiguous estimate of the plasma velocity. The present invention also includes a computer program product comprising a computer-usable medium having computer-readable program code embodied thereon which is adapted to be executed to implement a method for estimating solar photospheric plasma velocities in accordance with one or more aspects described herein.

Figure 3:
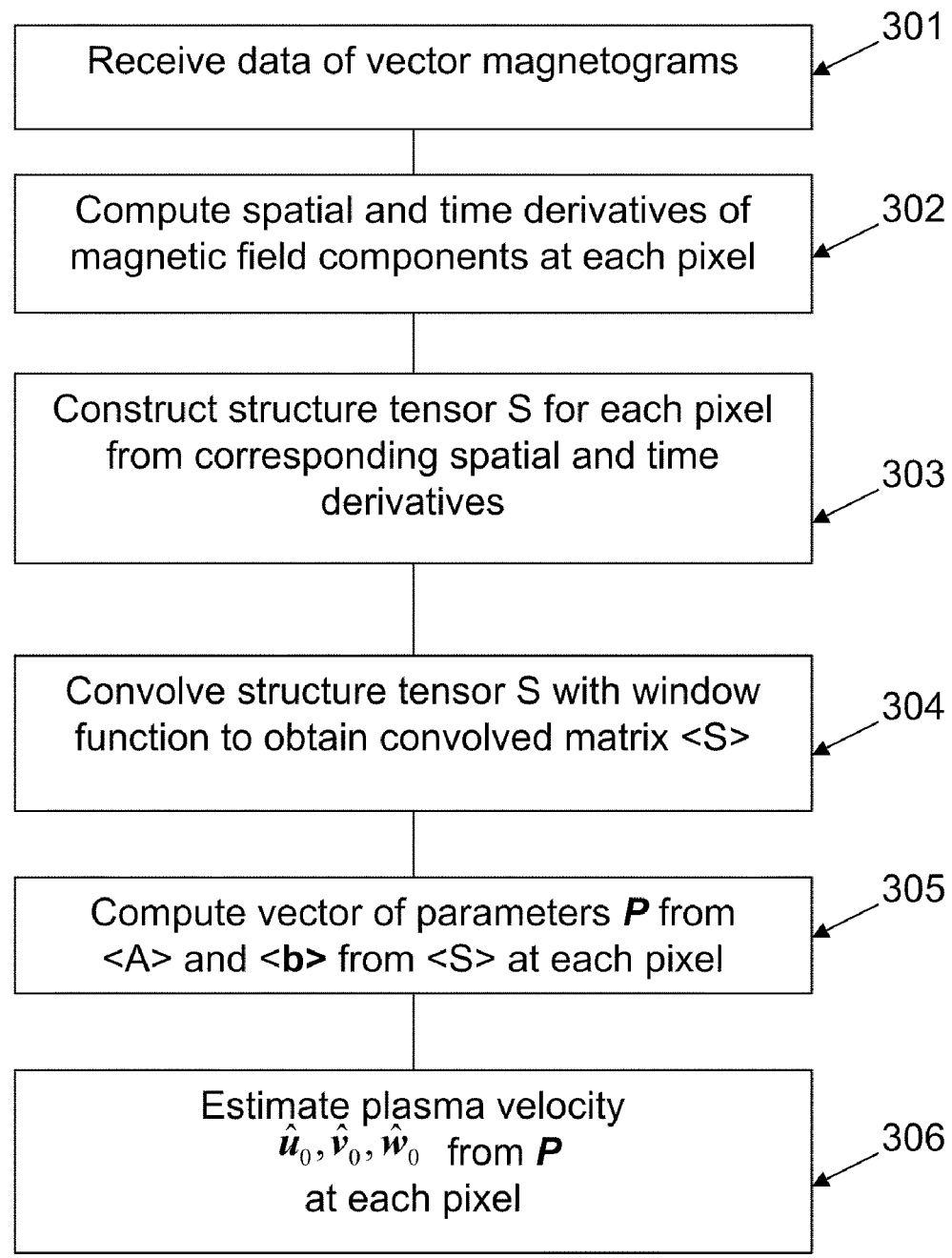
FIG. 3 depicts an exemplary logic flow that can be used for estimating plasma velocity v in accordance with the present invention.

FIG. 3 depicts an exemplary process flow that can be used in the DAVE4VM method of the present invention. At step 301 in accordance with the present invention, a computer can receive data representative of a plurality of vector magnetograms depicting magnetic fields $B_x, B_y, B_z$ within an area of the solar photosphere. The vector magnetograms digital images of the components of the magnetic fields of the solar photosphere, with all the magnetograms representing the magnetic field components at the same location of the solar photosphere. The pixels in each of the magnetograms are co-located or co-aligned such that only one p,q pixel exists for all the magnetograms for any p,q spatial point in the area of the photosphere represented by the magnetograms.

Figure 4:
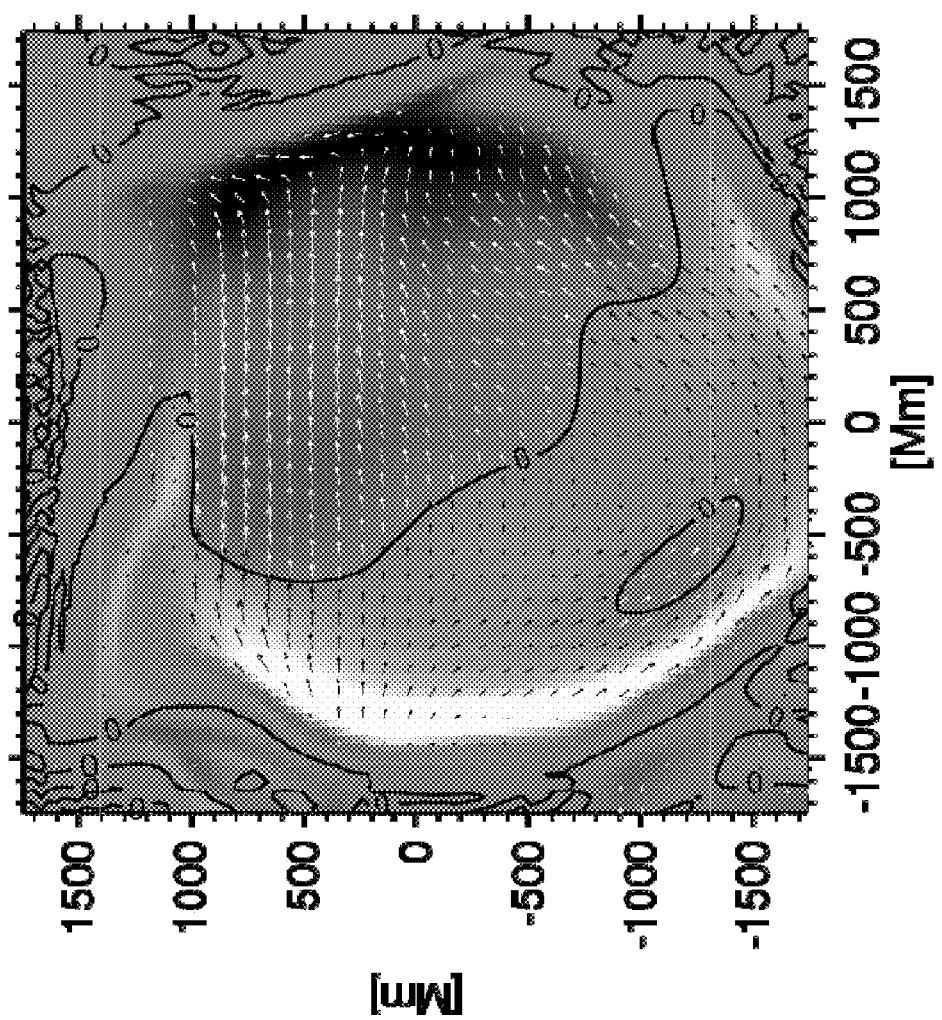
FIG. 4 depicts an exemplary vector magnetogram that can be used in the a method for estimating plasma velocity v in accordance with the present invention.

An exemplary vector magnetogram that can serve as the source of the magnetic field data is illustrated in FIG. 4, which shows a synthetic vector magnetogram extracted from ANMHD simulations, see Abbett (2002) and Abbett (2004), supra. The gray scale indicates the strength of the vertical magnetic field $B_z$, where white indicates $B_z > 0$ and black indicates $B_z < 0$. The black contours show the neutral lines (also called the polarity inversion lines) where the vertical magnetic field is zero. The arrows indicate the strength and direction of the horizontal magnetic field $B_h$.

In some embodiments, the computer receives data representative of three independent vector magnetograms such as that shown in FIG. 4, recorded at times $$t - \frac{\Delta t}{2}, t, \text{ and } t + \frac{\Delta t}{2}.$$

In other embodiments, the computer receives data representative of two vector magnetograms recorded at times number $$t - \frac{\Delta t}{2} \text{ and } t + \frac{\Delta t}{2},$$

with the computer averaging the values taken at $$t - \frac{\Delta t}{2} \text{ and } t + \frac{\Delta t}{2}$$

to obtain the values for a third magnetogram corresponding to time t.

Irrespective of how they are obtained, at step 302, in some embodiments, using the values of the vector magnetogram at time t, the computer computes the horizontal derivatives of all three of the spatial components at each pixel of the vector magnetograms, i.e. calculate $\partial_x B_x$, $\partial_x B_y$, $\partial_x B_z$, $\partial_y B_x$, $\partial_y B_y$, $\partial_y B_z$, and using the values of the magnetogram at times $$t - \frac{\Delta t}{2} \text{ and } t + \frac{\Delta t}{2}$$

the computer calculates the time derivative of the vertical component, $\partial_t B_z$. In other embodiments, one or more of these spatial and temporal derivatives can already have been computed, either by the computer performing the remainder of the steps as described herein or by another computer, so that the computer receives data of the derivatives, either instead of or in addition to data of the magnetograms, and in cases where both the temporal and spatial derivatives have already been computed, the process flow for estimating the plasma velocity as described herein can begin with the receipt of data of the derivatives so computed rather than receipt of data of the magnetograms themselves.

Importantly, the spatial derivatives used in the method of the present invention specifically include values for $B_x$ and $B_y$, and, unlike previous methods described above, which attempt to combine these values into a single variable with $B_z$, in the method of the present invention these values remain present as separate values throughout. It is the use of these separate variables in the method of the present invention that permits an accurate estimation of plasma velocity, energy, and helicity flux through the photosphere.

Once the spatial and temporal derivatives have been computed and the data of the derivatives has been received by the computer, at step 304 the computer can construct A symmetric structure tensor $$S(\chi; x, t) \equiv \begin{bmatrix} A & b \\ b & G_{99} \end{bmatrix}$$

for each pixel p,q in the magnetogram image. The A, b, and $G_{99}$ components of $S(\chi; x, t)$ comprise a set of $G_{ij}$ and $s_{ij}$ (and their corresponding symmetric $G_{ji}$ and $s_{ji}$) elements as shown in FIG. 5. Specifically, A comprises the matrix elements i,j where i and j each range from 0 to 8; b comprises the matrix elements i,j shown by the shading, where i ranges from 0 to 8 and j=9 and where i=9 and j ranges from 0 to 8; and $G_{99}$ is the matrix element i,j where i=9 and j=9.

The values of matrix elements $G_{ij}$ and $s_{ij}$ of S in accordance with the present invention are based on the magnetic field components derived from the vector magnetograms at that pixel and their spatial and time derivatives described above and are shown in FIGS. 6A-6C.

As seen in the set of matrix elements shown in FIGS. 6A-6C, the G, elements shown in FIGS. 6A and 6C include only $B_z$, the vertical component of the magnetic field. These elements formed the basis of the prior DAVE method described above, which, as discussed above, failed to provide an accurate estimate of the magnetic footpoint velocity u and the flux transport vector $uB_z$. The reason for this is that the physics of footpoint twisting described by $v_h B_z$, where $v_h = v_x \hat{x} + v_y \hat{y}$, is independent and distinct from the physics of flux emergence described by $v_z B_h$. Since the prior art method did not contain $v_z B_h$, the estimated flux transport vectors $uB_z$ were biased (i.e., incorrect) estimates of $v_h B_z$. See Welsch 2007 and Schuck 2008. The prior method DAVE did not capture the dynamics of flux emergence described by $v_z B_h$ which is essential to measuring the flows in evolving active regions on the Sun.

However, the structure tensor S in accordance with the present invention also contains a set of $s_{ij}$ elements shown in FIGS. 6B and 6C. These $s_{ij}$ elements provide an important correction to this prior method by specifically including $B_x$ and $B_y$, the horizontal components of the magnetic field. It is the inclusion of these horizontal components that fully captures the dynamics of flux emergence and therefore enables the method of the present invention to provide an accurate estimate of the horizontal and vertical plasma velocities $v_h$ and $v_z$, which in turn can provide an accurate estimate of the magnetic footpoint velocity u and thus of the flux transport vector $uB_z$.

The components of the matrix elements $G_{ij}$ and $s_{ij}$ were derived by the inventor hereof from the following error metric $C_{SSD}$:

$$C_{SSD} = \int dt dx^2 w(x-\chi, t-\tau) \left\{ \begin{array}{c} \partial_t B_z(x,t) + \\ \nabla_h \cdot [B_z v_h - v_z B_h] \end{array} \right\}^2 \quad (8a)$$

$$= \int dt dx^2 w(x-\chi, t-\tau) \left\{ \begin{bmatrix} \partial_t B_z(x,t) + \nabla_h \cdot \\ B_z(x,t) v_h(P, x-\chi) - \\ v_z(P, x-\chi) B_h(x,t) \end{bmatrix} \right\}^2,$$

This error metric was developed by the inventor hereof to measure how well a local velocity profile v having components $v_h$ and $v_z$ satisfies the magnetic induction equation $\partial_t B_z + \nabla_h \cdot (B_z v_h - v_z B_h) = 0$ over a subregion of the magnetogram sequence defined by a window function $w(x-\chi, t-\tau)$ centered at $(\chi, \tau)$, defining a subregion of the magnetogram sequence, where P is a vector of parameters described below, and $v_h = v_x \hat{x} + v_y \hat{y}$ and $v_z$ are the horizontal and vertical components of a three-dimensional affine velocity profile:

$$v(P; x) = \begin{pmatrix} \tilde{u}_0 \\ \tilde{v}_0 \\ \tilde{w}_0 \end{pmatrix} + \begin{pmatrix} \tilde{u}_x & \tilde{u}_y \\ \tilde{v}_x & \tilde{v}_y \\ \tilde{w}_x & \tilde{w}_y \end{pmatrix} \begin{pmatrix} x \\ y \end{pmatrix} \quad (8b)$$

where the coefficients ($\tilde{u}_0$ and $\tilde{v}_0$), and the ($\tilde{w}_0$), and correspond to the horizontal and vertical components of plasma velocity at the center of the window and the other subscripted parameters ($\tilde{u}_x$, $\tilde{u}_y$, $\tilde{v}_x$, $\tilde{v}_y$, $\tilde{w}_x$ and $\tilde{w}_y$) represent the corresponding best-fit local shears in the plasma flows.

At step 304 shown in FIG. 3, the computer takes the data of the structure tensor and convolves it with a window function $w(x-\chi, t-\tau)$ centered at $(\chi, \tau)$ to derive a convolved structure tensor $$\langle S \rangle \equiv \begin{bmatrix} \langle A \rangle & \langle b \rangle \\ \langle b \rangle & \langle G_{99} \rangle \end{bmatrix},$$

where $$\langle S \rangle = \int dt dx^2 w(x-\chi, t-\tau) S(\chi; x, t) \quad (9)$$

and the elements of $\rangle S \rangle$ comprise a weighted average of the elements of structure tensor $S(\chi, x, t)$ over the window.

At step 305 in FIG. 3, using any appropriate methodology such as singular value decomposition, the computer can compute a least-squares solution P to error metric $C_{SSD}$ from the convolved structure tensor $\langle S \rangle$ where:

$$P = -\langle A^{(-1)} \rangle_b \rangle \quad (10a)$$

As noted above, there are important new terms in the structure tensor $\langle S \rangle$, i.e., the $s_{ij}$ terms that involve the horizontal component of the magnetic field $B_h = B_x \hat{x} + B_y \hat{y}$, and these terms must be considered to accurately estimate the plasma velocities. As noted above, the aperture problem occurs when different velocities produce different image dynamics that are indistinguishable. See, e.g., D. Marr and S. Ullman, supra. If the aperture problem is completely resolved, det ($\langle A \rangle) \neq 0$ and the plasma velocity field defined by P over the entire window function will be unambiguous. However, there may be cases where $B_h = 0$ over the window and det ($\langle A \rangle) = 0$. In these and other cases where det ($\langle A \rangle) = 0$, the solution is not unique. To avoid problems such as these, the better approach often is to use the Moore-Penrose pseudo-inverse $\langle A \rangle^\dagger$ to solve for P because doing so can provide a numerically stable vector of parameters P even when det ($\langle A \rangle) = 0$. See G. Golub et al., "An Analysis of the Total Least Squares Problem," *SIAM Journal on Numerical Analysis*, Vol. 17, No. 6 (December 1980), pp. 883-893.

Thus, the computer can obtain P by transforming the data of the convolved structure tensor $\langle S \rangle$ where $$P = -\langle A \rangle^\dagger \cdot \langle b \rangle. \quad (10b)$$

The solution P is a vector of parameters $P = (\tilde{u}_0, \tilde{v}_0, \tilde{u}_x, \tilde{v}_y, \tilde{u}_y, \tilde{v}_x, \tilde{w}_0, \tilde{w}_x, \tilde{w}_y)$ where as noted above the values of ($\tilde{u}_0$ and $\tilde{v}_0$) correspond to the horizontal component of the plasma velocity $v_h = \tilde{u}_0 + \tilde{v}_0$ and ($\tilde{w}_0$) corresponds to the vertical component $v_z = \tilde{w}_0$ of the plasma velocity at the center of the window, i.e., where $x = \chi$.

Once P has been obtained, at step 306 shown in FIG. 3, the computer can extract the values of $\tilde{u}_0$, $\tilde{v}_0$, and $\tilde{w}_0$ from P to obtain the plasma velocity at that pixel. By repeating steps 305-306 shown in FIG. 3 for each pixel in the image, the computer can derive a plasma velocity field for all pixels in the vector magnetogram. Because the values of $\tilde{u}_0$, $\tilde{v}$, and $\tilde{w}_0$ derived in accordance with the present invention accurately reflect the physics of the footpoint twisting and the flux emergence of the plasma, they provide an accurate estimate of the horizontal and vertical plasma velocities $v_h$ and $v_z$ at all pixels in the vector magnetogram and thus at all points p, q in the area of the photosphere corresponding to the magnetogram, Thus, in accordance with the present invention, an accurate estimate of the plasma velocity $v = \tilde{u}_0$, $\tilde{v}_0$, $\tilde{w}_0$ within a local area of the photosphere can be made by taking the derivatives of the magnetic field components, constructing a structure tensor that specifically includes the horizontal magnetic field components $B_x$ and $B_y$, convolving the structure tensor with a window function defining the local area of interest, and finding the least-squares solution to the $C_{SSD}$ from elements of the convolved tenor.

More importantly, in accordance with the present invention, an accurate estimate of the flux transport vector $uB_z = (B_z v_h - v_z B_h)$ at each pixel can be determined from this plasma velocity where $v_h = \tilde{u}_0 + \tilde{v}_0$ and $v_z = \tilde{w}_0$.

Figure 1:
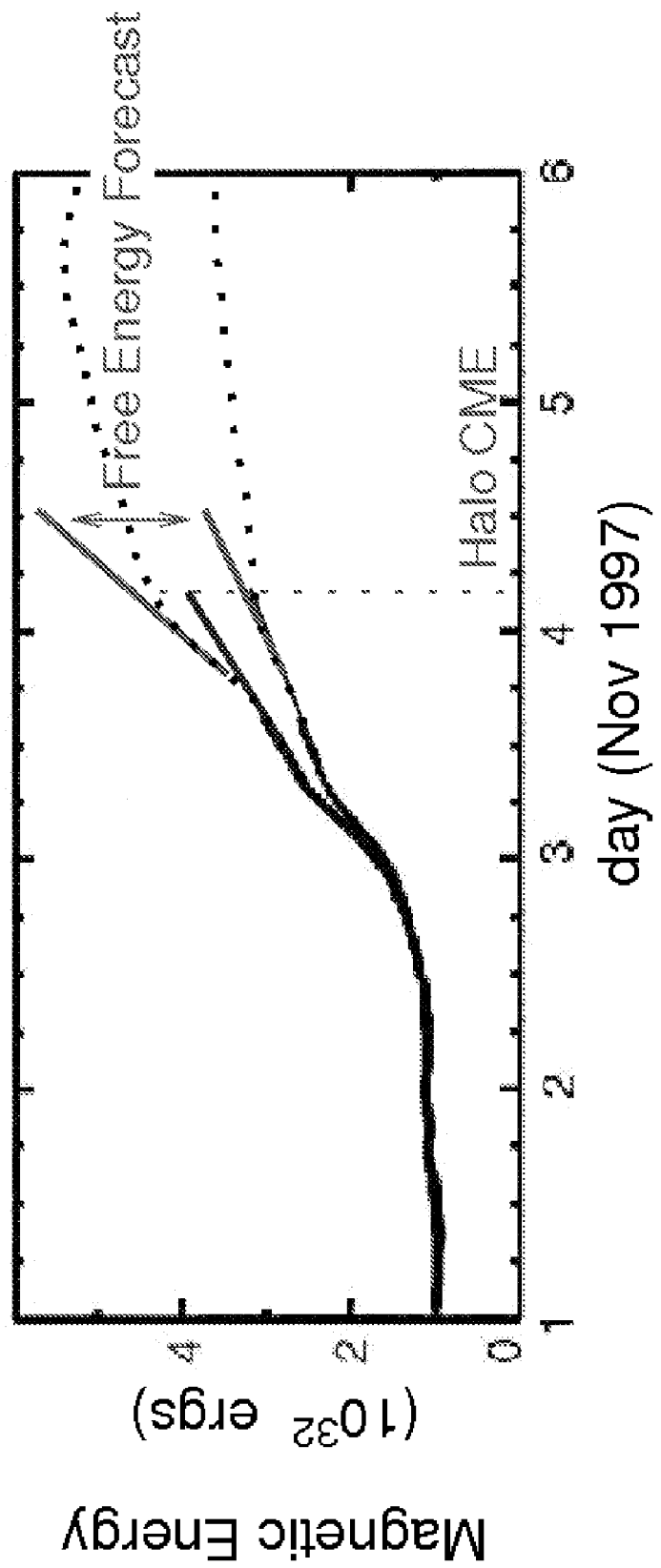
FIG. 1 is a plot depicting solar magnetic energy and energy flux over a six-day period coinciding with the Halo CME in 1997, showing the free energy between the minimum coronal potential magnetic field energy and the time integrated photospheric energy flux before, during, and after the time of the CME.
Figure 2A:
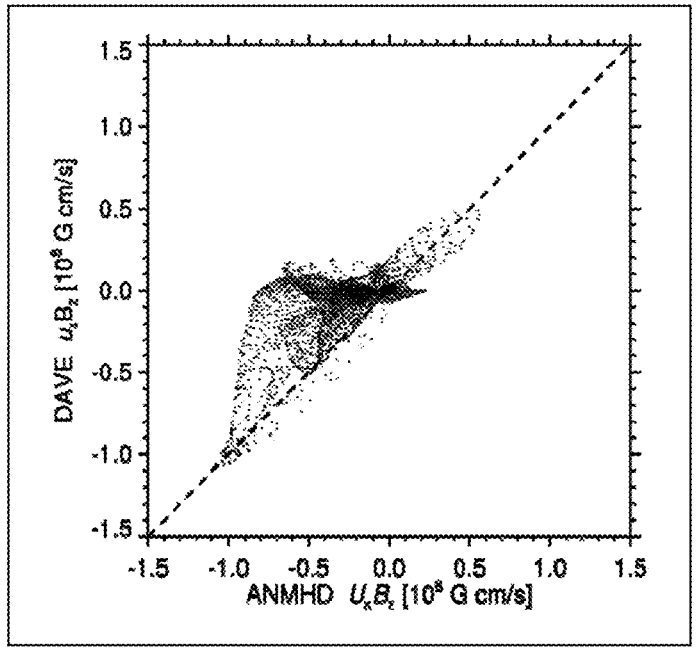
FIGS. 2A and 2B depict the x (FIG. 2A) and y (FIG. 2B) components of an estimated velocity flux transport vector $uB_z$ constructed using the differential affine velocity estimator (DAVE) method in accordance with the prior art plotted against a modeled ground truth velocity flux transport vector $UB_z$.
Figure 2B:
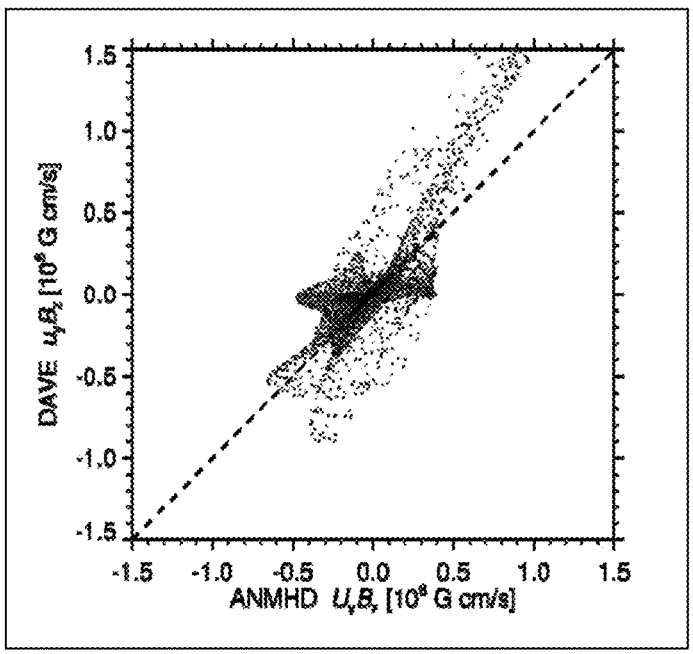
Figure 7A:
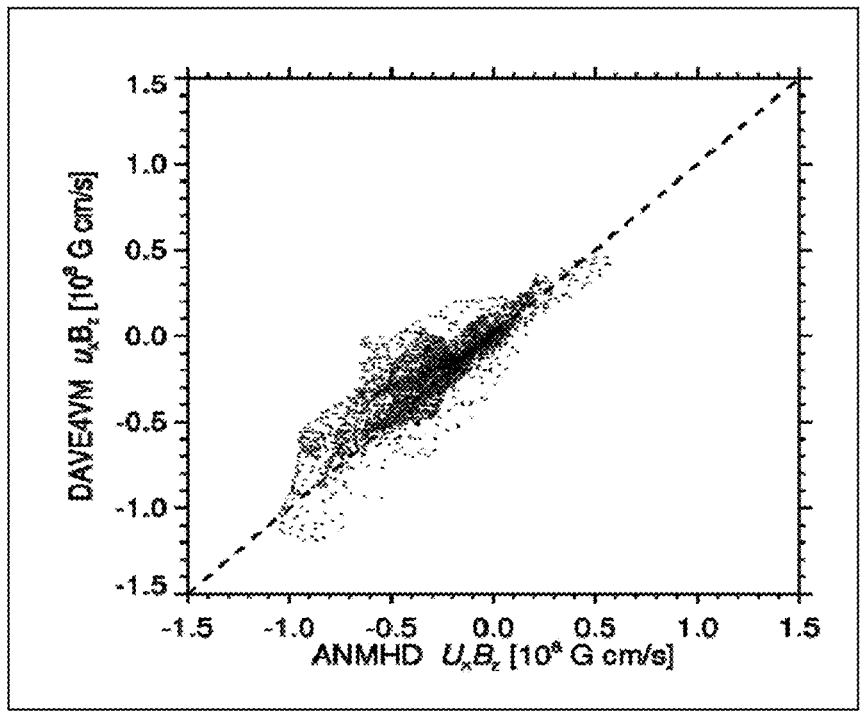
FIGS. 7A and 7B depict the x (FIG. 7A) and y (FIG. 7B) components of an estimated velocity flux transport vector $uB_z$ constructed using a differential affine velocity estimator for vector magnetograms (DAVE4VM) method in accordance with the present invention plotted against a modeled ground truth velocity flux transport vector $UB_z$.
Figure 7B:
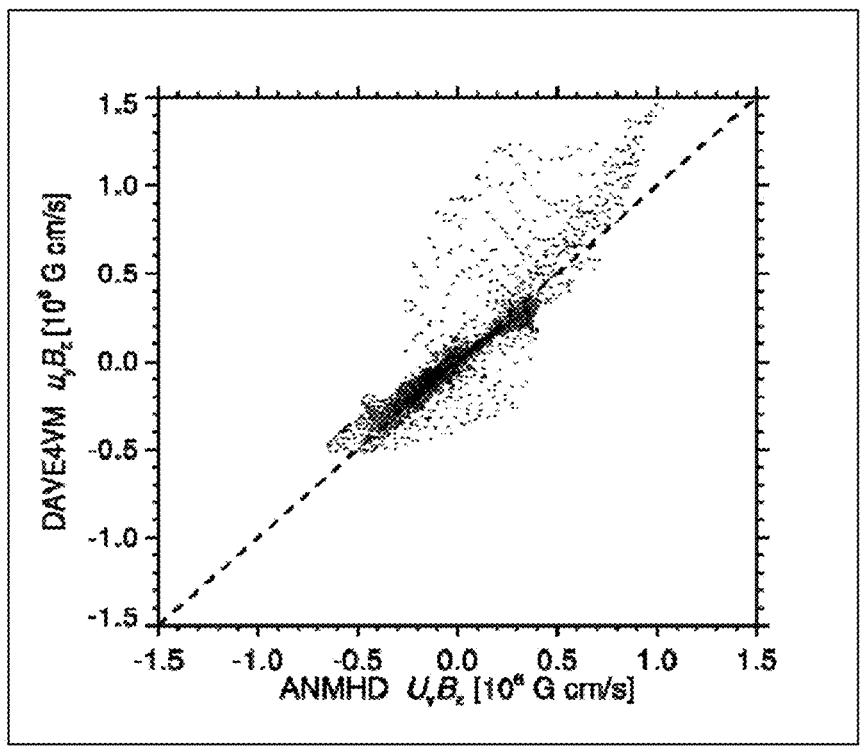

As shown in FIGS. 7A and 7B, the accuracy of the x (FIG. 7A) and y (FIG. 7B) components of the modeled flux transport vector $uB_z = (B_z v_h - v_z B_h)$ containing plasma velocity components $v_h$ and $v_z$ derived in accordance with the DAVE4VM method of the present invention is greatly improved and their values conform much more closely to the ground truth flux transport vector $UB_z$, than do the components of the modeled flux transport vector $uB_z$ derived in accordance with the prior DAVE method shown in FIGS. 2A and 2B. Such an improved flux transport vector $uB_z$ will in turn permit more accurate estimates of the relative helicity flux $$\frac{d\Delta H}{dt} = -\int 2A_p \cdot (uB_z) dx dy,$$

net energy flux $$\frac{d\Delta E}{dt} = -\int \frac{B_h \cdot (uB_z)}{4\pi} dx dy$$

and net free energy flux $$\Delta E_f = \int dt \left( \frac{d\Delta E}{dt} - \frac{dE_p}{dt} \right)$$

described above, and so may enable more accurate forecasts of the occurrence of a coronal mass ejection.

One skilled in the art will appreciate that one or more aspects of a method for estimating solar photospheric plasma velocities as described herein can be accomplished by one or more processors executing one or more sequences of one or more computer-readable instructions read into a memory of one or more computers from volatile or non-volatile computer-readable media capable of storing and/or transferring computer programs or computer-readable instructions for execution by one or more computers, where volatile media can include a memory such as a dynamic memory in a computer and non-volatile media can include one or more magnetic media such as a compact disk, hard disk, floppy disk, tape, magneto-optical disk, PROM (EPROM, EEPROM, flash EPROM), SRAM, SDRAM, physical media such as punch card or paper tape, or any other media such as a chemical or biological medium.

Although particular embodiments, aspects, and features have been described and illustrated, it should be noted that the invention described herein is not limited to only those embodiments, aspects, and features. For example, although the magnetic fields and plasma velocities are described herein in terms of conventional Cartesian coordinates, the methodology of the present invention can be used with only minor revisions with magnetic fields and plasma velocities that are expressed in other coordinate systems. It should be readily appreciated that these and other modifications may be made by persons skilled in the art, and the present application contemplates any and all modifications within the spirit and scope of the underlying invention described and claimed herein.

What is claimed is:

1. A computer-implemented method for estimating solar plasma velocities, comprising:

receiving, at a computer programmed with appropriate software, data representing a plurality of vector magnetograms, each vector magnetogram being a digital image comprising a plurality of pixels p,q and each pixel p,q having corresponding magnetic field components $B_x$ and $B_y$ in a horizontal image plane and $B_z$ in a vertical plane normal to the horizontal image plane, the pixels of each vector magnetogram being co-aligned so that pixel p,q of a first magnetogram corresponds to pixel p,q of a second magnetogram;

receiving, at the computer, data representing a plurality of horizontal spatial derivatives $\partial_x B_x$, $\partial_x B_y$, $\partial_x B_z$, $\partial_y B_x$, $\partial_y B_y$, and $\partial_y B_z$ of the horizontal and vertical magnetic field components at pixel p,q and further receiving, at the computer, data representing a time derivative $\partial_t B_z$ of the vertical magnetic field component at pixel p,q;

transforming, at the computer, the data of the spatial and temporal derivatives and the data of the magnetic field components into a structure tensor S, the structure tensor including a plurality of elements expressly containing at least one of the horizontal magnetic field components $B_x$ and $B_y$, the terms of the structure tensor being defined to minimize an error between a magnetic induction equation including a modeled plasma velocity and the data of the vector magnetogram;

convolving, at the computer, the structure tensor S with a window function centered at pixel p,q to produce a convolved structure tensor ⟨S⟩, the elements of the convolved structure tensor ⟨S⟩ including an average of the values of the structure tensor S over a window defined by the window function; and obtaining, at the computer, a least-squares solution to an error metric $C_{SSD}$ from the convolved structure tensor ⟨S⟩, the solution including data of a horizontal plasma velocity $v_h$ and a vertical plasma velocity $v_z$ at pixel p,q.

2. The computer-implemented method for estimating plasma velocities according to claim 1, further comprising estimating, at the computer, a horizontal plasma velocity $v_h$ and a vertical plasma velocity $v_z$ for each pixel p,q in the image to obtain data of a plasma velocity field over an area of the photosphere.

3. The computer-implemented method for estimating plasma velocities according to claim 1, further comprising computing, at the computer, at least one of the spatial and time derivatives at pixel p,q.

4. The computer-implemented method for estimating plasma velocities according to claim 3, further comprising receiving, at the computer, data of three vector magnetograms at times $$t - \frac{\Delta t}{2}, t, \text{ and } t + \frac{\Delta t}{2};$$

computing, at the computer, $\partial_x B_x$, $\partial_x B_y$, $\partial_x B_z$, $\partial_y B_x$, $\partial_y B_y$, $\partial_y B_z$ based on the corresponding values of $B_x$, $B_y$, and $B_z$ at time t; and computing at the computer, $\partial t B_z$ based on the values of $B_z$ at times $$t - \frac{\Delta t}{2} \text{ and } t + \frac{\Delta t}{2}.$$

5. The computer-implemented method for estimating plasma velocities according to claim 3, further comprising receiving, at the computer, data of two vector magnetograms at times $$t - \frac{\Delta t}{2} \text{ and } t + \frac{\Delta t}{2};$$

averaging, at the computer, the values of $B_x$, $B_y$, and $B_z$ at times $$t - \frac{\Delta t}{2} \text{ and } t + \frac{\Delta t}{2}$$

to obtain an average value of $B_x$, $B_y$ and $B_z$ at time t;

computing, at the computer, $\partial_x B_x$, $\partial_x B_y$, $\partial_x B_z$, $\partial_y B_x$, $\partial_y B_y$, $\partial_y B_z$ based on the corresponding average values of $B_x$, $B_y$ and $B_z$ at time t; and computing, at the computer, $\partial t B_z$ based on the values of $B_z$ at times $$t - \frac{\Delta t}{2} \text{ and } t + \frac{\Delta t}{2}.$$

6. The computer-implemented method for estimating plasma velocities according to claim 1, wherein the error metric $C_{SSD}$ is:

$$C_{SSD} = \int dt dx^2 w(x - \chi, t - \tau) \left\{ \begin{array}{l} \partial_t B_z(x, t) + \\ \nabla_h \cdot [B_z v_h - v_z B_h] \end{array} \right\}^2$$

$$= \int dt dx^2 w(x - \chi, t - \tau) \left\{ \begin{array}{l} \partial_t B_z(x, t) + \nabla_h \cdot \\ \left[ \begin{array}{l} B_z(x, t) v_h(P, x - \chi) - \\ v_z(P, x - \chi) B_h(x, t) \end{array} \right] \end{array} \right\}^2;$$

wherein $w(x-\chi, t-\tau)$ is a window function centered at $(\chi, \tau)$, defining a subregion of the horizontal image plane, P is a vector of parameters where $P=(\tilde{u}_0, \tilde{v}_0, \tilde{u}_x, \tilde{v}_y, \tilde{u}_y, \tilde{v}_x, \tilde{w}_0, \tilde{w}_x, \tilde{w}_y)$, and $v_h = v_x + v_y$ and $v_z$ are the horizontal ($\tilde{u}_0$ and $\tilde{v}_0$) and the vertical ($\tilde{w}_0$) components, respectively, of a three-dimensional affine velocity profile;

$$v(P; x) = \begin{pmatrix} \tilde{u}_0 \\ \tilde{v}_0 \\ \tilde{w}_0 \end{pmatrix} + \begin{pmatrix} \tilde{u}_x & \tilde{u}_y \\ \tilde{v}_x & \tilde{v}_y \\ \tilde{w}_x & \tilde{w}_y \end{pmatrix} \begin{pmatrix} x \\ y \end{pmatrix}$$

and wherein the term $v_h(P, x-\chi)$ is referenced from the center of the window at $x=\chi$ so that the coefficients ($\tilde{u}_0$ and $\tilde{v}_0$) and ($\tilde{w}_0$) and correspond to the horizontal and vertical components of plasma velocity at the center of the window.

7. A computer-implemented method for forecasting a coronal mass ejection on the solar photosphere, comprising:

receiving, at a computer programmed with appropriate software, data representing a plurality of vector magnetograms, each vector magnetogram being a digital image comprising a plurality of pixels, each pixel having corresponding magnetic field components $B_x$ and $B_y$ in a horizontal image plane and $B_z$ in a vertical plane normal to the horizontal image plane, the pixels of each vector magnetogram being co-aligned so that pixel p,q of a first magnetogram corresponds to pixel p,q of a second magnetogram;

receiving at the computer, data representing a plurality of horizontal spatial derivatives $\partial_x B_x$, $\partial_x B_y$, $\partial_x B_z$, $\partial_y B_x$, $\partial_y B_y$, and $\partial_y B_z$ of the horizontal and vertical magnetic field components at pixel p,q and further receiving, at the computer, data representing a time derivative $\partial_t B_z$ of the vertical magnetic field component at pixel p,q;

transforming, at the computer, the data of the spatial and temporal derivatives and the data of the magnetic field components into a structure tensor S, the structure tensor including a plurality of elements expressly containing at least one of the horizontal magnetic field components $B_x$ and $B_y$, the terms of the structure tensor being defined to minimize an error between a magnetic induction equation including a modeled plasma velocity and the data of the vector magnetogram;

convolving, at the computer, the structure tensor S with a window function centered at pixel p,q to produce a convolved structure tensor ⟨S⟩, the elements of the convolved structure tensor ⟨S⟩ including an average of the values of the structure tensor S over a window defined by the window function;

obtaining, at the computer, a least-squares solution to an error metric $C_{SSD}$ from the convolved structure tensor ⟨S⟩, the solution including data of a horizontal plasma velocity $v_h$ and a vertical plasma velocity $v_z$ at pixel p,q;

transforming, at the computer, the data of the plasma velocities $v_h$ and $v_z$ and the magnetic field components $B_x$, $B_y$, and $B_z$ into data of the magnetic flux transport vector $uB_z$; and transforming, at the computer, the data of the magnetic fields in the vector magnetogram and the data of the magnetic flux transport vector $uB_z$ into data of at least one of a net free energy $\Delta E_f$ available for production of a CME.

\* \* \* \* \*